United States Patent [19]

Marie

[11] 3,850,391

[45] Nov. 26, 1974

[54] SAFETY DEVICES FOR A SYSTEM FOR AUTOMATICALLY DRIVING A VEHICLE

[75] Inventor: Gabriel Yves Marie, Neuilly/Marne, France

[73] Assignee: Regie Autonome des Transports Parisiens et Inter-Elec, Paris and Aubervilliers, France

[22] Filed: Aug. 31, 1973

[21] Appl. No.: 393,521

[30] Foreign Application Priority Data
Sept. 5, 1972 France .......................... 72.31389

[52] U.S. Cl. ............ 246/182 R, 180/105 E, 105/61
[51] Int. Cl. ........ B61l 3/08, G01p 3/12, B60l 15/22
[58] Field of Search ......... 246/182 C, 182 B, 187 B, 246/182 R, 187 C; 324/78 E, 78 Z; 105/61; 177/DIG. 8, 163, 16, 164; 180/98, 105 E

[56] References Cited
UNITED STATES PATENTS

| | | | |
|---|---|---|---|
| 3,270,199 | 8/1966 | Smith | 246/182 C |
| 3,374,844 | 3/1968 | Rogers | 177/163 X |
| 3,457,403 | 7/1969 | Smith | 246/182 C |
| 3,496,535 | 2/1970 | Tyzack | 246/182 C |
| 3,516,506 | 6/1970 | Furlong | 177/164 |

FOREIGN PATENTS OR APPLICATIONS

| | | | |
|---|---|---|---|
| 1,123,356 | 8/1968 | Great Britain | 177/163 |

*Primary Examiner*—Robert S. Ward, Jr.
*Attorney, Agent, or Firm*—Gerard J. Weiser; Alfred Stapler; Karl L. Spivak

[57] ABSTRACT

The system comprises a generator adapted to substitute a braking order for the orders given by a control device, when the vehicle travels through the sequences of its path at a prohibitive speed. According to the invention, the device comprises trigger means preferably comprising a capacitor 3 enabling it to supply a braking order only after the vehicle has travelled a predetermined distance.

9 Claims, 3 Drawing Figures

SAFETY DEVICES FOR A SYSTEM FOR AUTOMATICALLY DRIVING A VEHICLE

The invention relates to improvements made to systems for automatically driving a vehicle and adapted to control the effective speed of the vehicle in dependence on a given operating program. More particularly, the invention relates to a safety device adapted to order emergency braking when the real speed of the vehicle, at a place on its path, exceeds a threshold speed, the value of which is set for the aforementioned place.

The present improvements supplement those already provided in the patent application No. 143,163 filed on May 13, 1971 in the name J. P. Malon and J. A. Loreau.

The aforementioned system for automatically driving a vehicle, inter alia a train, comprises means adapted to supply a space signal to the vehicle each time it has travelled through a section or sequence of its path, the length of each section being an increasing (e.g. linear) function of the desired speed of the vehicle at the corresponding place along its path. According to the abovesaid patent application, the system also comprises the following in combination, on the vehicle:

a control device using the space signals to give braking or traction orders to the vehicle traction or braking means depending on whether the vehicle has travelled through the section in a time less or greater than a predetermined time, a generator actuated by the space signals and adapted to supply a variable (e.g. saw-tooth) signal at the moment when the vehicle has travelled through each section of its path, the value of the signal being dependent on the time taken by the vehicle to travel through the section, and a safety device supplied by the variable signal produced by the generator and adapted to substitute an emergency braking order for the orders given by the control device, when the maximum values of the variable signals produced by the generator are less than a threshold value associated with the predetermined time at the corresponding sections. The threshold value is selected so as to correspond to a speed which is substantially (e.g. 10%) higher than the set-value speed for the corresponding program section.

The object of the invention is to provide a safety device of the aforementioned kind which avoids untimely emergency braking, which is unpleasant for the passengers in the vehicle.

Another aim of the invention is to provide a safety device of the aforementioned kind which is adapted to produce an order to stop, both when the vehicle is travelling at a prohibitive speed and when the vehicle is travelling at a (low) predetermined speed, in order to prevent the vehicle from going backwards when it is travelling up a slope and to prevent the traction means from failing to operate as the result of an incident.

According to the invention, the safety device comprises trigger means enabling the safety device to provide an emergency braking order, on the one hand, after the vehicle has travelled a length only slightly different from a predetermined distance greater than the longest path section after the appearance of a variable signal having a maximum value less than the threshold value and, on the other hand, if the maximum value has not exceeded the threshold value over the predetermined distance.

Preferably, the trigger means comprise a capacitor, means for charging the capacitor each time the maximum value of the variable signal exceeds the threshold value, and means for measuring the length of the path travelled by the vehicle and adapted to deliver a pulse (advantageously of constant duration) each time the vehicle has travelled a given length, the given length being less than the shortest of the track sections, the trigger means also comprising discharge means adapted to reduce the charge accumulated by the capacitor by a given amount each time a pulse is provided by the measuring means, and a comparator adapted to compare a signal representing the charge on the capacitor with a reference signal and adapted to deliver or not to deliver, depending on the result of the comparison, a comparison signal which is used to produce, or not used to produce, the emergency braking order.

In one embodiment of the invention, the safety device comprises means adapted to deliver a signal to the comparator input, the amplitude of the signal representing the capacitor charge and the frequency of the signal being the same as that of the pulses delivered by the means for measuring the length of the path travelled by the vehicle, the comparator being such that the comparison signal, if any, has the same frequency as the pulses supplied by the measuring means.

Advantageously, in the latter case the safety device also comprises a second capacitor, means for charging the second capacitor and actuated by the comparison means, and a circuit for discharging the second capacitor and having a time constant such that the charge on the second capacitor falls below a given value when the frequency of the comparison signals is less than a given frequency $f_0$ corresponding to a given speed $V_0$, the safety device being such that, when the charge on the second capacitor is less than the given value, an order to stop the vehicle is produced by the safety device.

Other features, advantages and characteristics of the invention will be clear from the following more detailed description of a preferred embodiment of the invention, wherein reference is made to the drawings, in which.

Figure 1:
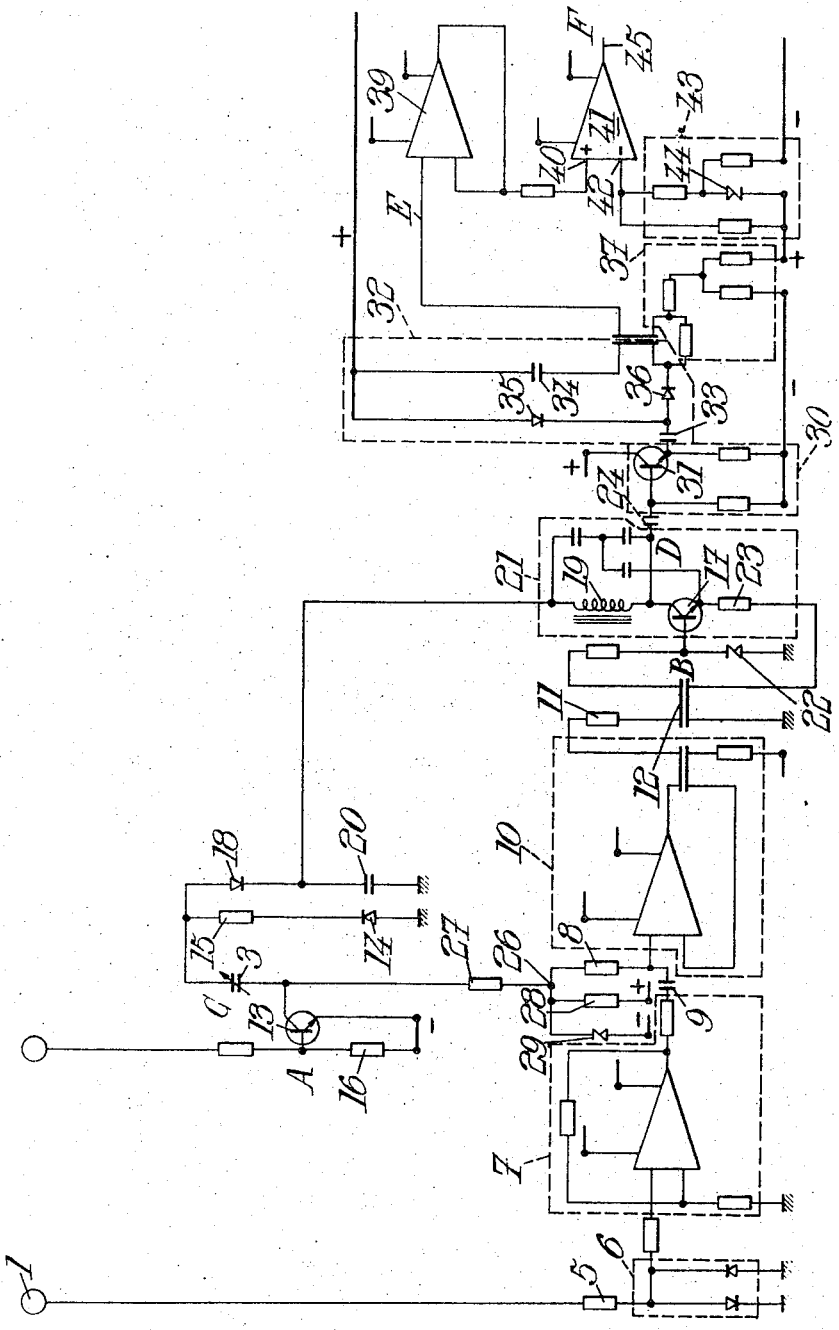
FIGS. 1 and 2 represent the safety device according to the invention.

First, we shall briefly describe the method of actuating the automatic driving system to which a safety device according to the invention is particularly applicable.

The system for automatically driving a vehicle, such as a railway or underground train, is of the kind adapted to control the effective speed of the train in dependence on a given operating program. To this end, the path followed by the vehicle is divided into sections or sequences having a length proportional to the desired speed of the vehicle at the corresponding section. The sections may or may not be embodied on the track. The system also comprises means for providing the vehicle with a space signal each time the vehicle has travelled through one track section. In the case where the sections are embodied by a rectilinear cable through which a current flows, the cable being disposed along the track and comprising irregularities in herring-bone form at the boundaries between the sections, the means adapted to supply a space signal comprise pick-ups adapted to deliver a signal each time the train travels above the aforementioned irregularities. The automatic driving system comprises means for pulling and braking the train and a device controlling the aforementioned means; the control device uses the space signals in order to actuate a traction or a braking means, as the case may be. The desired speed at each section is equal to the ratio of the length of the section to a predetermined time $T_0$. For example, if the vehicle has travelled through a section in a time less than the time $T_0$, its speed is greater than the desired speed and the control device actuates a "notch" of the braking means. On the other hand, if the train travels through a section in a time greater than the predetermined time, its speed is less than the desired speed and the control device actuates a notch of the traction means.

The safety device according to the abovesaid patent application comprises a generator adapted to provide a variable signal whose amplitude, at the moment when the vehicle has travelled through each section of its path, represents the time taken by the train to travel through the corresponding section. In the example, the variable signal is a sawtooth which begins at each section and ends at the end thereof. The amplitude of the saw-tooth signal delivered by the generator at the end of each section is therefore proportional to the time taken by the train to travel through the section. Of course, the appearance and disappearance of the saw-teeth provided by the generator is controlled by the space signals. The safety device also comprises comparison means for comparing the maximum value of each saw-tooth with a threshold value corresponding to a time $T_1$ less than the time $T_0$. Finally, the safety device comprises means adapted to deliver a signal for actuating an emergency braking order when the signal supplied by the comparison means corresponds to the fact that the aforementioned maximum value of each saw-tooth (at the end of the section) is less than the aforementioned threshold value. In other words, if the train travels through a section in a time less than $T_1$ and consequently at a speed greater than that corresponding to the threshold value, the emergency braking of the train is triggered. The time $T_1$ is e.g. 10% less than the time $T_0$, and therefore corresponds to a value approximately 10% greater than the set-value speed for the program.

Consequently, when the speed of the train is greater than the set speed but less than the speed corresponding to a threshold value, only the ordinary train braking or traction means will come into action, by actuating an appropriate braking or traction notch. If, on the other hand, the speed of the train exceeds the speed corresponding to the threshold value greater than the set speed, a safety device will operate and will substitute the emergency braking order for the order to operate a braking or traction notch. Safety device (according to the abovesaid patent application) delivers a pulse at the end of each section when the real speed of the train is less than the speed corresponding to the threshold value. On the other hand, when the real speed exceeds the speed corresponding to the threshold value greater than the set speed, the safety device will be put in operation and will substitute the emergency braking order for the order to actuate a braking or traction notch.

The safety device according to the abovesaid patent application delivers a pulse at the end of each section when the real speed of the train is less than the speed corresponding to the threshold value. When, on the other hand, the real speed exceeds the speed corresponding to the threshold value, the pulses disappear and the emergency braking is triggered. It may happen, however, that instantaneous, unimportant incidents not requiring an emergency braking of the train temporarily prevent the formation of the signal indicating that the train is not travelling at a prohibitive speed, and consequently causes undesirable emergency braking.

In the embodiment of the invention shown in the drawings, the safety device comprises trigger means and means 1 (FIG. 1) for measuring the length of the path travelled by the vehicle. The trigger means are adapted to enable the safety device to provide an emergency braking order when the following conditions are fulfilled. The first condition is that the train must have travelled a given length $L_1$ slightly different from the predetermined distance L greater than the longest path section after the disappearance of the signal 2 (A, FIG. 3) indicating that the train is not travelling at a prohibitive speed, i.e. after the appearance of a saw-tooth whose maximum value (at the end of a section) is less than a threshold value corresponding to a speed $V_1$ greater than the set-value speed; the aforementioned length $L_1$ travelled by the train is determined by the measuring means 1. The second condition is that the train continues to travel at a speed greater than $V_1$ over the given length $L_1$, i.e. that, over the given length, no signal appears indicating that the train is moving at a speed less than the speed $V_1$. Since the length $L_1$ is greater than the longest track section, the train will have travelled at least an entire section, and thus be able to emit a signal 2 at least once before coming to the end of the distance $L_1$.

Figure 3:
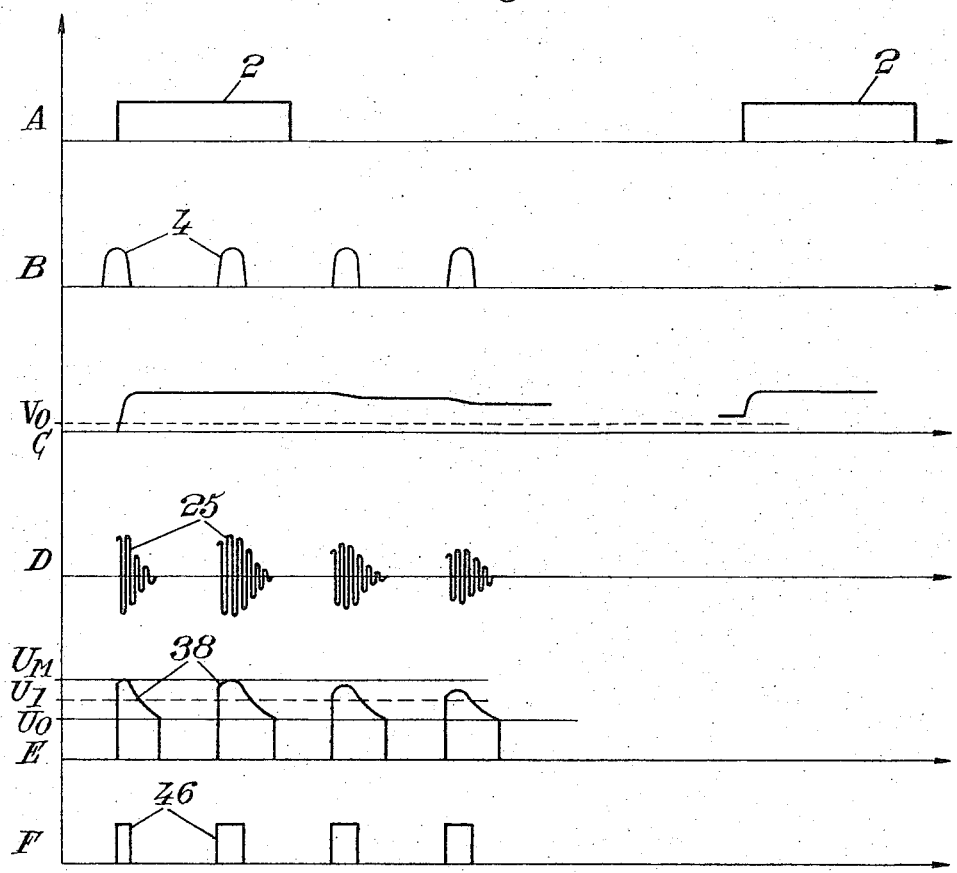
FIG. 3 shows diagrams illustrating the operation of the various components of the safety device shown in FIGS. 1 and 2.

The signals 2 produced each time the train has travelled a path section at a speed less than the speed $V_1$ set for that section, are represented by diagram A in FIG. 3. In the diagrams shown in FIG. 3, the abscissae show the times and the ordinates show the voltages. Each of the aforementioned signals shown in diagram A is a rectangular pulse 2 of constant duration; in the example, the duration is 10 milliseconds.

Figure 2:
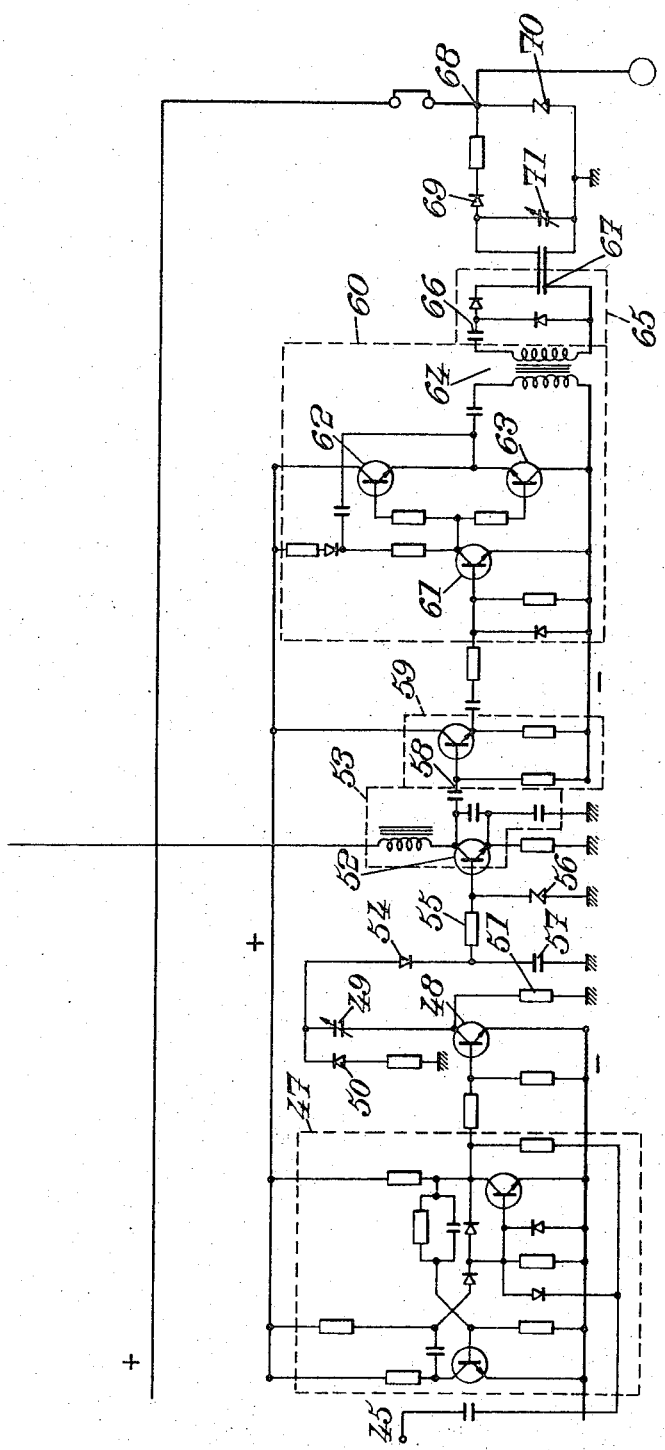

In the embodiment of the safety device shown in FIGS. 1 and 2 an adjustable-capacity capacitor 3 is provided and is adapted to be charged during the time when pulses 2 appear and to be partially discharged each time when pulses 4 appear (diagram B, FIG. 3), pulses 4 being supplied at the same rate as the pulses supplied by the measuring means 1.

The measuring means 1 comprise a known "phonic wheel" which delivers a given number of cycles of a sinusoidal signal each time the train has travelled a distance equal to the circumference of a wheel. The sinusoidal signal is transmitted via a resistor 5 to the input of a peak-clipping circuit 6 comprising two diodes connected in parallel and in opposite directions. The clipped sinusoidal signal is transmitted to a "trigger" shaping device 7 such as a "Schmidt trigger" device, which converts the clipped sinusoidal signals into rectangular signals. The rectangular signals are differentiated in a differentiating circuit comprising a resistor 8 and a capacitor 9 and the resulting differentiated signals are transmitted to a monostable 10 producing pulses having a constant duration, i.e. 70 microseconds in the example. The constant-duration rectangular pulses delivered by the monostable 10 are finally converted by a circuit comprising a resistor 11 and a capacitor 12 in order to obtain pulses 4 as shown on diagram B. Pulses 4 have slightly rounded peaks but their duration is equal to that (70 microseconds) of the pulses delivered by monostable 10.

The circuit for charging capacitor 3 comprises a NPN transistor 13, the base of which is supplied with the pulses 2 shown in diagram A. The charge circuit also comprises a diode 14 whose anode is connected to earth and a resistor 15, one terminal of which is connected to the cathode of diode 14 and the other terminal of which is connected to the first plate of capacitor 3; the second plate of capacitor 3 is connected to the collector of transistor 13 and the emitter of transistor 13 is polarized by the negative terminal of a voltage source (not shown) which shapes the emitter at a negative voltage (−12 volts in the example). The base of transistor 13 is connected to its emitter by a resistor 16. Consequently, when the base does not receive pulses, transistor 13 is cut off and when it receives pulses 2 having an amplitude greater than −12 volts, transistor 13 is saturated so that capacitor 3 can be charged.

The first plate of capacitor 3 is connected via a diode 18 and an inductor 19 to the collector of a transistor 17 having NPN-type conductivity. The cathode of diode 18 is connected to earth via a capacitor 20 whose capacity is low with respect to that of capacitor 3. Transistor 17 forms part of an oscillating circuit 21 whose resonator circuit comprises inductor 19. In the example, the frequency of oscillator 21 is 300 kHz. The base of transistor 17 is adapted to receive pulses 4 (diagram B) and is connected to the cathode of a Zener diode 22 whose anode is connected to earth. The emitter of transistor 17 is connected to earth via a resistor 23. Accordingly, when pulse 4 appears at the base of transistor 17, the pulse saturates transistor 17 and simultaneously enables oscillator 24 to operate, i.e. to deliver trains 25 of sinusoidal oscillations at its output 24, the oscillations being represented in diagram D in FIG. 3. Of course, the aforementioned operation of oscillator 21 is not possible unless the potential of the collector of transistor 17 is sufficient, i.e. unless the charge on capacitor 3 is sufficient.

When transistor 17 is saturated, capacitor 3 can discharge via the (low) collector-emitter resistance of transistor 17. Discharge of capacitor 3 is possible since, on the one hand, its first plate is connected to earth via diode 18, inductor 19, the collector-emitter resistance of transistor 17 and resistor 23 and, on the other hand, its second plate is connected to a point 26 whose potential is kept at zero (constituting a "dummy earth") via a resistor 27. Point 26 is kept at zero potential (like earth) by a circuit which comprises, on the one hand, a resistor 28 one terminal of which is connected to point 26 and the other terminal of which is connected to the positive terminal of a source (not shown) which keeps the potential of the last-mentioned terminal at e.g. +12 volts and, on the other hand, a Zener diode 29 whose cathode is connected to point 26 and whose anode is connected to the negative terminal of a source (not shown) which keeps the anode at a negative potential (−12 volts) equal in absolute value to the potential at which the second terminal of resistor 28 is kept.

It can be seen that, owing to the presence of the Zener diode 22, the potential of the emitter of transistor 17 is substantially constant so that capacitor 3 can discharge at a constant current; the discharge is therefore linear, i.e. the variation in the voltage at the terminals of capacitor 3 is linear in dependence on time during the appearance of pulses 4.

It should also be noted that the charge of transistor 3 (the voltage at its terminals) determines the potential of the collector of transistor 17 and, therefore, the maximum amplitude of each train 25 of sinusoidal pulses.

Capacitor 20 is used to keep up the production of trains 25 when a pulse 4 and a pulse 2 appear simultaneously. This is because capacitor 20 is charged at the same time as capacitor 3; of course, owing to its low capacitance, it can discharge completely during a pulse 4. Pulses 4 are rounded in order to prevent them from abruptly triggering oscillator 21 since, if rectangular pulses were applied to the base of transistor 17, oscillator 21 would be abruptly actuated and produce transient pulses interfering with the operation of the device.

Diagram C in FIG. 3 shows the variation in the voltage at the terminals of capacitor 3 (its charge) in dependence on time. As can be seen from diagram C, capacitor 3 is completely charged at the end of a pulse 2 (A, FIG. 3) and loses only a given proportion of its charge during a pulse 4.

The output 24 of oscillator 21 is connected to the input of a rectifying and impedance-matching circuit 30 comprising a transistor 31. A circuit 32 comprising two low-capacitance capacitors 33, 34 and two diodes 35, 36 convert the trains of sinusoidal pulses delivered by circuit 30 into their envelope. A d.c. voltage $U_0$ produced by a circuit 37 made up of resistors is superposed on the envelope signal of the sinusoidal pulse trains. The envelope signals to which the d.c. voltage has been added are shown by curves 38 in diagram E in FIG. 3. In the described embodiment, the d.c. voltage $U_0$ has a value of +2 volts and the maximum value $U_M$ of signals 38 is +6 volts.

Signals 38 are transmitted to the input of an impedance-matching circuit 39 essentially comprising an operational amplifier connected in a "follower circuit". The output of circuit 39 is connected to the positive (+) input 40 of a comparator 41. The negative (−) input 42 of comparator 41 is connected to the output of a circuit 43 adapted to produce a constant voltage. In the example, circuit 43 is made up of resistors and a Zener diode 44.

Comparator 41 does not deliver a (positive, constant-amplitude) signal at its output 45 unless the voltage appearing at its positive input 40 is greater than the voltage appearing at its negative input 42. Signals 46 produced at the output 45 of comparator 41 are shown in diagram F in FIG. 3. The constant voltage $U_1$ (diagram F) produced by circuit 43 has a value between voltages $U_0$ and $U_M$; in the example, its value is of the order of 4 volts.

Consequently, rectangular pulses 46 will not appear at the output 45 unless the charge on capacitor 3 exceeds a given value, since the amplitude of signals 38 represent the charge on capacitor 3. Since, however, capacitor 3 is partially discharged every time a pulse 4 appears, i.e. every time the train has travelled a length $l$, this charge represents the distance travelled by the train after the pulse 2 has appeared. In other words, comparator 41 will not deliver pulses 46 unless the train has travelled a distance less than a distance L, which is determined by the difference between voltages $U_M$ and $U_1$, after the appearance of the last pulse 2 (diagram A). The length L is constant since the difference $U_M-U_1$ is constant and corresponds to a predetermined number of pulses 4 or, i.e. a predetermined number of times the length $l$.

Of course, in the present case the frequency at which pulses 46 appear is equal to the frequency at which pulses 4 appear (diagram B). In this case, the safety device is designed to produce an order for emergency braking of the train as soon as pulses 46 stop appearing at the output 45 of comparator 41.

The urgent braking order can consist either in an order to actuate the special brake notches for returning the speed of the train to the speed set by its program, or an order to stop.

Output 45 of comparator 41 is connected to the input of a monostable 47 with supplies pulses of constant duration (e.g. 1 millisecond), the pulses supplied by comparator 41 having a variable duration. The output of monostable 47 is connected to the base of an NPN-type transistor 48, the collector of which is connected to the first plate of a capacitor 49 having an adjustable capacitance. The second plate of capacitor 49 is connected to earth via a diode 50 and a resistor.

During the appearance of the pulses supplied by monostable 47, transistor 48 is saturated and capacitor 49 is charged between earth and the negative terminal of a voltage source (not shown) connected to the emitter of transistor 48 via diode 50 and the (low) collector-emitter resistance of transistor 48.

The collector of transistor 48 is likewise connected to earth via a resistor 51; the second plate of capacitor 49 is also connected to the base of a transistor 52 of an oscillator 53 via a diode 54 and a resistor 55. The base of transistor 52 is connected to earth via a Zener diode 56. Furthermore, the common point of the cathode of diode 54 and resistor 55 is connected to earth via a capacitor 57 whose capacity is low with respect to that of capacitor 49.

When transistor 48 is cut off, i.e. when monostable 47 does not deliver pulses, capacitor 49 is discharged via, on the one hand, resistor 51 and, on the other hand, diode 54, resistor 55 and Zener diode 56. The discharge current of capacitor 49 enables oscillator 53 to deliver a sinusoidal signal at its output 58. Capacitor 57 maintains a current at the base of transistor 52 when capacitor 49 is charged during the production of a pulse by monostable 47.

The sinusoidal signal (having a frequency of 15 kHz in the example) produced at the output 58 of oscillator 53 is transmitted via an impedance-matching circuit 59 to an amplifying circuit 60. Circuit 60 comprises inter alia a transistor 61 and two transistors 62, 63 forming a push-pull circuit; it also comprises a transformer 64. The signal produced at the secondary winding of transformer 64 is rectified by a circuit 65 comprising diodes and capacitors 66 and 67. The signal appearing at the terminals of capacitor 67 is transmitted to the output 68 of the device via a diode 69. The signal produced at the output 68 of the device is maintained constant by a Zener diode 70. This signal does not appear at output 68 unless the output 45 of comparator 41 delivers pulses which can charge capacitor 49 and thus operate oscillator 53. The presence or absence of a d.c. signal at output 68 determines whether emergency braking is applied or not.

The capacity of capacitor 49 and the resistance of its discharge circuit, inter alia the value of resistor 55, are selected so that, if the pulses produced by comparator 41 and consequently by monostable 47 are at a low frequency below a given frequency $f_0$, capacitor 49 is completely discharged between the appearance of two such pulses. When capacitor 49 has been completely discharged, oscillator 55 ceases to deliver a signal, so that an emergency braking order can be sent. According to an advantageous embodiment, the stop in the production of pulses by oscillator 53 is used to supply an order to stop the train. The frequency of the pulses is proportional to the speed of the train, i.e. the frequency $f_0$ corresponds to a given train speed, so that the train stops when its speed falls below a predetermined speed, e.g. 1 metre per second.

The latter features provides additional safety. Otherwise, if the train is climbing a slope and if the traction means fail at the same time, the train may stop and descend the slope backwards without the pulses 2 disappearing after travel through a distance L. According to the last-mentioned feature, the train stops when its speed falls below the speed of 1 metre per second, so that the last-mentioned possibility is eliminated.

However, means (not shown) should be provided to prevent the safety device from being triggered when the train starts. The last-mentioned means comprise, for example, a two-position switch, having a first position in which the safety device is switched off and a second position in which the device is switched on.

Capacitor 67 has a very low capacitance, so that it can be instantaneously charged and discharged without producing a time constant which would introduce a delay between the instant when oscillator 53 ceases to deliver a periodic signal and the disappearance of the signal at output 68. Such a delay would result in an equal delay in the production of a braking order. In other words, there would be an increase in the length L travelled by the train before the braking order was transmitted. Since the delay is substantially constant, the length L will increase in proportion to the speed. It may be advantageous to use the aforementioned delay to obtain a distance L which varies with the speed. This is because the train should be able to stop after a short distance on those parts of its path where its speed has to be low, whereas those parts of its path on which the programmed speed is relatively high are the least dangerous, i.e. the train can stop after a longer distance in these parts of its journey. In the embodiment shown, therefore, a capacitor 71 having an adjustable capacitance is connected in parallel with capacitor 67 in order to vary the length L in dependence on the speed. In the application described, more particularly for the underground railway, the length L is equal to 8 metres for low speeds and approximately 15 metres for a higher speed, e.g. 70 km/h.

Alternatively, a constant delay may be introduced by increasing the capacitance of capacitor 49 since, if the capacitance thereof is large, its discharge current can operate oscillator 53 for a certain period after the disappearance of the pulses supplied at the output of comparator 45.

Clearly, as the preceding clearly shows, the invention is in no way limited to those applications and embodiments which have been described in detail, but includes all variants.

I claim:

1. A safety device for a system for automatically driving a vehicle adapted to control the effective speed thereof in dependence on a given operating program, the system comprising means adapted to supply a space signal to the vehicle each time it has travelled a section of its path, the length of the signal being an increasing function of the desired speed of the vehicle at the corresponding place on its path in the system comprising a control device on the vehicle, the device using the space signals to give braking or traction orders to the vehicle traction and braking means, depending on whether the vehicle has travelled through the section in a time greater or less than a predetermined time, the system also comprising a generator actuated by the space signals and adapted to supply a variable signal at the moment when the vehicle has travelled through each section of its path, the value of the signal being dependent on the time taken by the vehicle to travel through the section, the safety device being supplied by the variable signal produced by the generator, and adapted to replace the orders given by the control device by an emergency braking order when the maximum values of the signals generated by the generator remain below a threshold value associated with the predetermined time at the corresponding sections, the safety device being characterised in that it comprises trigger means enabling it to supply a braking order, on the one hand, only after the vehicle has travelled a length slightly different from a predetermined distance greater than the longest of the track sections after the appearance of a varaible signal whose maximum value is less than the threshold value and, on the other hand, if the maximum value has not exceeded the threshold value over the predetermined distance.

2. A safety device according to claim 1, characterised in that the trigger means comprise a capacitor, means for charging the capacitor to a given voltage each time the maximum value of the variable signal exceeds the threshold value, means for measuring the length of the path travelled by the vehicle and adapted to supply a pulse each time the vehicle has travelled a given length less than the shortest section of its path, discharge means adapted to reduce the charge accumulated by the capacitor by a given amount, at each appearance of a pulse supplied by the measuring means, and a comparator adapted to compare a signal representing the charge on the capacitor with a reference signal and adapted to deliver a comparison signal which is used to actuate the emergency braking order.

3. A safety device according to claim 2, characterised in that the discharge means comprise a transistor oscillator and the device comprises means for supplying the transistor base with pulses having a constant duration and the same frequency as the pulses provided by the measuring means, the discharge means being such that, on the one hand, the oscillator supplies a pulse train during each constant-duration pulse, the amplitude of the pulses in the pulse train being variable in dependence on the capacitor charge and, on the other hand, the capacitor discharge circuit comprises the collector-emitter resistance of the transistor, the safety device also comprising shaping means for connecting the oscillator output to that input of the comparator which is adapted to receive the signal representing the capacitor charge.

4. A safety device according to claim 2, characterised in that it comprises means adapted to deliver a signal at the comparator input, the amplitude of the signal representing the capacitor charge and the frequency of the signal being the same as that of the pulses delivered by the means for measuring the length of the path travelled by the vehicle, the comparator being such that the comparison signal, if any, has the same frequency as the pulses supplied by the measuring means.

5. A safety device according to claim 4, characterised in that it comprises a second capacitor, means for charging the second capacitor and actuated by the comparison signals, and a circuit for discharging the second capacitor, the circuit having a time constant such that, between the appearance of two pulses of the comparison signal, the charge on the second capacitor falls below a given value when the frequency of the comparison signals is less than a given frequency $f_0$ corresponding to a given speed $V_0$, the safety device being such that, when the charge on the second capacitor is less than the aforementioned given value, an order to stop the vehicle is produced by the safety device.

6. A safety device according to claim 5, characterised in that it comprises a second oscillator adapted to output an a.c. signal when the current discharging the second capacitor exceeds a given value; amplifying means connected to the output of the second oscillator and rectifying means for rectifying the signal supplied by the amplifying means and producing a signal which constitutes an emergency braking order if it is present and does not constitute an emergency braking order if it is absent.

7. A safety device according to claim 2, characterised in that it comprises delay means for delaying the production of the emergency braking order by a given period after the vehicle has travelled the aforementioned predetermined distance.

8. A safety device according to claim 5, characterised in that it comprises a second oscillator adapted to output an a.c. signal when the current discharging the second capacitor exceeds a given value; amplifying means connect to the output of the second oscillator and rectifying means for rectifying the signal supplied by the amplifying means and producing a signal which constitutes an emergency braking order if it is present and does not constitute an emergency braking order if it is absent; said rectifying means including at least one capacitor constituting delay means for delaying the production of the emergency braking order by a given period after the vehicle has travelled the aforementioned predetermined distance.

9. A safety device according to claim 5, characterised in that it comprises delay means for delaying the production of the emergency braking order by a given period after the vehicle has travelled the aforementioned predetermined distance and in that it comprises means for adjusting the capacity of the second capacitor.

* * * * *